(12) United States Patent
Akhter

(10) Patent No.: US 7,849,490 B2
(45) Date of Patent: Dec. 7, 2010

(54) METHOD AND APPARATUS PROVIDING SCALABILITY FOR CHANNEL CHANGE REQUESTS IN A SWITCHED DIGITAL VIDEO SYSTEM

(75) Inventor: Aamer Akhter, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 11/717,454

(22) Filed: Mar. 12, 2007

(65) Prior Publication Data
US 2008/0229379 A1    Sep. 18, 2008

(51) Int. Cl.
H04N 7/173     (2006.01)
H04N 7/16      (2006.01)
G06F 3/00      (2006.01)

(52) U.S. Cl. .................. 725/120; 725/139; 725/117; 725/38; 725/91; 725/93; 725/100; 725/103; 725/105; 725/111; 725/114; 725/116; 725/121; 725/131; 725/135; 725/140; 725/143; 725/144; 725/151; 348/E7.071; 348/E7.072

(58) Field of Classification Search .......... 725/117, 725/38–42, 73, 80, 93, 100, 103, 105, 109, 725/111, 114, 116, 121, 131, 135, 139, 140, 725/143, 151; 348/E7.071, E5.105; 370/62, 370/230.1, 468, 262
See application file for complete search history.

(56) References Cited

U.S. PATENT DOCUMENTS

| 6,728,965 B1 * | 4/2004 | Mao ........................ 725/38 |
| 2005/0289623 A1 * | 12/2005 | Midani et al. ............ 725/100 |
| 2006/0135136 A1 * | 6/2006 | Kim et al. ............... 455/414.1 |
| 2007/0173993 A1 * | 7/2007 | Nielsen et al. ............ 701/35 |
| 2008/0056128 A1 * | 3/2008 | Joyce et al. ............. 370/230.1 |

* cited by examiner

Primary Examiner—Joseph P Hirl
Assistant Examiner—Mary Anne Kay
(74) Attorney, Agent, or Firm—Merchant & Gould

(57) ABSTRACT

A method, apparatus and computer program product for providing scalability for channel change requests in a Switched Digital Video system is presented. A request for a channel change is received. A determination is made regarding whether a channel requested by the request for a channel change is currently being provided to the settop box. When the channel requested by the request for a channel change is being provided to the settop box then the request for a channel change is buffered for transmission at a later time. When the channel requested by the request for a channel change is not being provided to the settop box then the request for a channel change is immediately sent to an SDV server in communication with the settop box.

20 Claims, 4 Drawing Sheets

METHOD AND APPARATUS PROVIDING SCALABILITY FOR CHANNEL CHANGE REQUESTS IN A SWITCHED DIGITAL VIDEO SYSTEM

BACKGROUND

Presently, U.S. cable systems deliver hundreds of channels to some 60 million homes, while also providing a growing number of people with high-speed Internet access.

In 1989, General Instruments demonstrated that it was possible to convert an analog cable signal to digital and transmit it in a standard 6-MHz television channel. Using Motion Picture Expert Group (MPEG) compression, CATV systems installed today can transmit up to 10 channels of video in the 6-MHz bandwidth of a single analog channel. When combined with a 550-MHz overall bandwidth, this allows the possibility of nearly 1,000 channels of video on a system. In addition, digital technology allows for error correction to ensure the quality of the received signal.

In current Hybrid fiber-coaxial systems, a fiber optic network extending from the operator's central office carries all video channels out to a fiber optic node which services any number of homes ranging from 1 to 2,000 homes. From this point, all channels are sent via coaxial cable to each of the homes. Note that only a percentage of these homes are actively watching channels at a given time. Rarely are all channels being accessed by the homes in the service group.

In a switched video (SV) system, the unwatched channels do not need to be sent. In cable TV systems in the United States, equipment in the home sends a channel request signal back to a distribution hub (also referred to as a Switched Digital Video server or SDV server). If a channel is not currently being transmitted on the coaxial line, the distribution hub allocates a new Quadrature Amplitude Modulation (QAM) channel and transmits the new channel to the coaxial cable via the fiber optic node. For this to work, the equipment in the home must have two-way communication ability. Switched video uses the same mechanisms as Video on Demand (VOD) and may be viewed as a non-ending video on demand show that any number of users may share.

For a switched video system to work on cable systems, all digital television users in a subscription group must have devices capable of communicating to the distribution hub in a compatible manner. Switched video is sometimes abbreviated as SDV for switched digital video, or SVB for switched video broadcast.

Switched Digital Video technology enables Multiple System Operators (MSOs) to offer consumers a wider variety of programming while effectively managing Hybrid Fiber/Cable (HFC) network bandwidth. From a business perspective, SDV offers MSOs a number of key benefits. First, SDV is a cost-effective bandwidth management tool that immediately reduces HFC bandwidth requirements compared with traditional "linear" content delivery. Second, the SDV system bandwidth scales as a function of viewership rather than as a function of programs offered. Therefore SDV gives MSOs the ability to offer new programming tiers including premium sports, ethnic and other niche programming that drive customer retention and may drive new revenue through premium subscriptions. Third, SDV technology enables channel change times that are comparable to those in today's networks, so SDV services can be delivered transparently to consumers without a change in the television viewing experience, thereby eliminating concerns about viewer adoption that have plagued other new services. Finally, SDV systems capture very detailed viewership data in a secure manner that protects consumer privacy. This powerful information is used to optimize system performance, but it can also be used to optimize program offerings and lineups, and to enhance targeted advertising.

SUMMARY

Conventional mechanisms such as those explained above suffer from a variety of deficiencies. One such deficiency is that conventional SDV systems, the settop boxes immediately forward all channel change requests to an SDV server. This can result in the SDV server getting overloaded with channel change requests at certain times. For example, a large number of requests make take place when a particular popular program is about to start, for example when a digital Personal Video Recorder (PVR) is synchronized. As a result many viewers may request a channel change in order to view the popular program (e.g. millions of viewers switching to HBO at 9:00 p.m. on Sunday night to watch "The Sopranos"). In such a situation, the SDV server is inundated with channel change requests, causing a slowing down of SDV services between the SDV server and the corresponding settop boxes. The performance of the SDV server is a minor problem, the larger problem is the narrow upstream channels between the settop box and the SDV server become overloaded.

Embodiments of the invention significantly overcome such deficiencies and provide mechanisms and techniques that provide a buffering of channel change requests under certain conditions. In a particular embodiment of a method for providing scalability for channel change requests in a Switched Digital Video system, the method includes receiving a request for a channel change. The method further includes determining if a channel requested by the request for a channel change is currently being provided to the settop box as part of the block of channels being provided to the settop box. When the channel requested is being provided to the settop box then the transmission of the request can be buffered and delayed for a later time. On the other hand when the channel requested by the request for a channel change is not being provided to the settop box then immediately sending the request for a channel change to an SDV server in communication with the settop box.

Other embodiments include a computer readable medium having computer readable code thereon for providing channel change requests in a Switched Digital Video system. The compute readable medium includes instructions for receiving a request for a channel change at a settop box. The compute readable medium also includes instructions for determining if a channel requested by the request for a channel change is being provided to the settop box. The computer readable medium additionally includes instructions for when the channel requested by the request for a channel change is being provided to the settop box then buffering the request for a channel change for transmission of the request for a channel change at a later time as well as instructions for when the channel requested by the request for a channel change is not being provided to the settop box then immediately sending the request for a channel change to an SDV server in communication with the settop box.

Still other embodiments include a computerized device (e.g. a settop box), configured to process all the method operations disclosed herein as embodiments of the invention. In such embodiments, the computerized device includes a memory system, a processor, communications interface in an interconnection mechanism connecting these components. The memory system is encoded with a process that provides channel change requests in a Switched Digital Video system explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing channel change requests in a Switched Digital Video system, as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
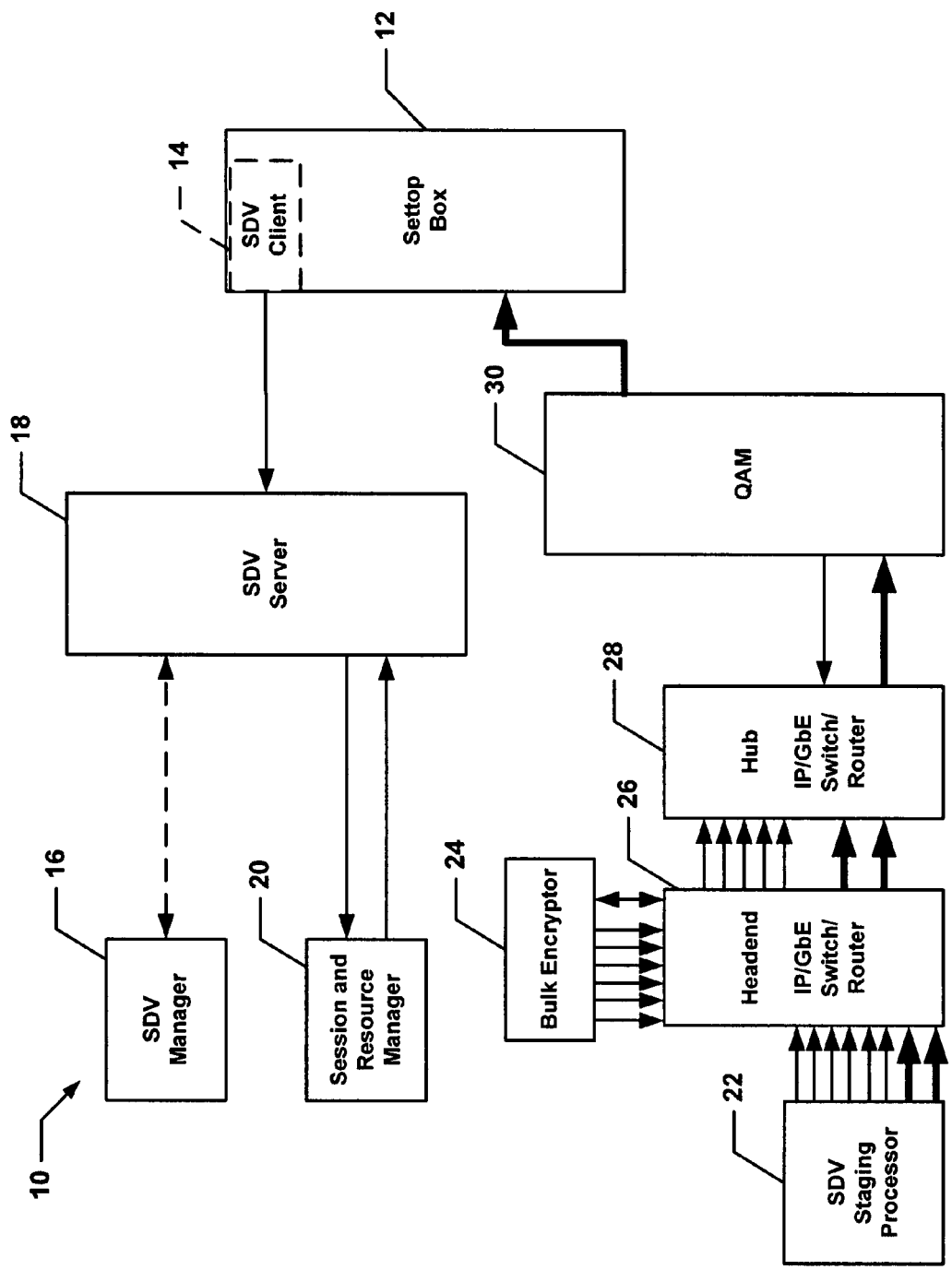
FIG. 1 depicts a block diagram of a particular embodiment of a switched digital video system.

Referring now to FIG. 1, an example Switched Digital Video system 10 incorporating embodiments of the present invention is shown. The system 10 includes a settop box 12 having an SDV client 14. The settop box 12 is in communication with an SDV sever 18 and QAM 30. The SDV server is in communication with an SDV manager 16 and a Session and Resource Manager (SRM) 20. The QAM 30 is in communication with a Hub Internet Protocol/Gigabit Ethernet (IP/GbE) Switch/Router 28, which in turn is in communication with a Headend IP/GbE Switch/Router 26. The Headend IP/GbE Switch/Router 26 is also in communication with a Bulk Encryptor 24 and with an SDV staging processor 22.

In a typical headend, content is received from multiple sources, including satellite, terrestrial off-air, fiber transport, storage media, IP data network and the like. The receiving equipment for these sources uses various standard or proprietary physical connections and interface standards. The SDV Staging Processor 22 performs multiple functions to groom the various sources for input to the SDV system 10.

The SDV staging processor 22 translates the various source interfaces to User Datagram Protocol (UDP)/IP encapsulated packets carried in Ethernet frames. The SDV staging processor also converts any Variable Bit Rate (VBR) streams to clamped or Constant Bit Rate (CBR) streams. For some content, the staging processor 22 may convert one bit rate to another.

Further, the staging processor 22 converts any multi-program transport streams (MPTS) to single-program transport streams (SPTS), performs digital program insertions (DPI) to insert local ads into the source content, and performs segmentation of program streams into separate events for storage on a media subsystem.

The output of the staging processor 22 may be unicast or multicast IP. In the case of encrypted streams, the staging processor outputs a unicast IP stream bound for the bulk encryptor 24. In the case of an SDV stream for which encryption is not required, the staging processor may output a multicast stream directly into the switching network.

Since SDV streams are shared by multiple viewers, they are treated as broadcast streams for purposes of encryption. Since the encryption device is not aware of, and does nothing unique for individual viewers, encryption of SDV streams is most effectively centralized in the headend rather than integrated into edge modulators. This is most efficiently done with an IP network-attached Bulk Encryptor 24. For encrypted switched streams, the bulk encryptor 24 receives IP unicasts and generates and sources the IP multicasts. It may also be used to generate multicasts for unencrypted streams to simplify network management if desired. The bulk encryptor 24 is implemented as a network attached device, so it is possible to migrate some or all bulk encryption to the network edge in order to accommodate future ad-insertion zones, without significant impact to the network design.

As in all HFC systems, the QAM modulator 30 enables the transmission of a multiplex of digital streams via a Radio Frequency (RF) carrier in an HFC spectrum channel. The digital streams may be composed of strictly MPEG transport packets, or could contain IP packets, as do QAMs used for Data Over Cable Service Interface Specifications (DOCSIS) Cable Modem Termination Systems (CMTSs). The SDV system 10 uses the QAM modulator 28 to request (join) and terminate (leave) IP multicasts, and to transmit programs as MPEG transport packets in RF. IP encapsulation is not used in the RF output of the QAM modulator 30. Note that because IP multicast is used in the "core" of the SDV network, it is a straightforward extension of the system to continue IP transport to the end user. This can be accomplished through a CMTS in HFC access networks, or through another type of edge device for other access technologies, for example.

In the SDV system 10 described here, the QAM modulator 30 interfaces to an element manager for provisioning and control. Provisioning sets the output frequencies, modulation type, and Transport Stream Identifiers (TSID) on each output carrier and IP addresses of control and content ports. A control system or Session and Resource Manager 20 (SRM, described in detail below), which may be the same as the provisioning system, allocates QAM spectrum to various applications such as Video on Demand (VOD) and SDV. Spectrum may be allocated to the applications on the basis of entire QAM carriers (inter-carrier QAM sharing—sharing of bandwidth within a multi-carrier QAM modulator chassis) or even within QAM carriers (intra-carrier QAM sharing). Such allocation may be static or dynamic.

For any QAM carrier to be used for SDV, the modulator must support session-based input-to-output stream mapping, as opposed to table-based mapping. Upon request of the SDV server 18, the SRM 20 allocates a number of "shell sessions" each with a session identifier (sessionID), a nominal bandwidth, and a RF carrier assignment. Content multicast address, program number, and actual bandwidth are not yet specified at this point; hence the name "shell" session, implying that this session is an empty reservoir or pipe to be filled with content at a later time.

By using this shell session mechanism, a portion of the available bandwidth on the edge QAM 30 is reserved for exclusive (albeit possibly temporary) use by the SDV (or other service) server 18. This allows the SRM 20 to act as an arbitrator of edge QAM resource contention. It may seem redundant for a master controller (e.g., the SRM 20) to allocate shell sessions for management by a subservient controller (e.g., the SDV server 18), however, this capability is essential in the SDV application because of the real-time nature of SDV control traffic, and the volume of this traffic that is generated during the course of ordinary TV viewing. The ability of multiple real-time sub-controllers (SDV server, VOD server, etc.) to work within allocations of edge resource bandwidth relieves the master controller (SRM 20) of the burden of time-critical high-volume tasks. This makes the system more reliable and more scalable while retaining the ability to share bandwidth dynamically between multiple services.

When it is required to provide a program to a user, or users, in a particular group of settops boxes 12, or service group, the SDV server will select a shell session on a QAM modulator feeding that service group. By referring to the sessionID, the SDV server 18 will command the QAM modulator 30 to "bind" that session to a specific program content stream. The server references this content by its IP multicast address. It further provides a program number for use at the output of the QAM modulator 30, and also logs the actual program bandwidth.

Upon receiving session binding information for a multicast that it is not already a member of, the QAM modulator 30 sends an Internet Group Management Protocol (IGMP)v3 "membership report" requesting to "join" the specified multicast group. At this point the edge switch-router receiving this request performs the actual switch of the content to the GbE port connected to that QAM modulator. The QAM modulator 30 receives this content, "de-jitters" it, multiplexes it with other content on the specified carrier, and modulates the composite digital stream for transmission to the service group. Session-based QAM modulators enable full intra-carrier QAM sharing. Carriers can be designated as "shared" between multiple applications. The SRM 20 will set up VOD sessions and/or shell session on a given QAM carrier upon request. The shell sessions on that carrier are then available for binding by the SDV server 18 at the same time that VOD sessions are available on the same carrier.

For a mix of VOD and SDV, the SRM 20 continues to function as the primary resource manager, but the SRM 20 dynamically apportions parts (sessions) of the bandwidth of an individual QAM RF carrier (intra-carrier QAM sharing) to the SDV server 18 (described in detail below), which, for SDV purposes, communicates directly with the settop boxes and performs bindings on the QAM shell sessions and bandwidth that it has been allocated. The SDV server 18 uses an extension to the Time Warner Session Setup Protocol (SSP) to request, from the SRM 20, shell sessions on a QAM feeding a given service group. The SRM 20 identifies available bandwidth on the service group QAM, and provides shell session space to the SDV server 18 thereby reserving bandwidth on the QAM modulator for exclusive use by the SDV server 18. In the reply from the SRM 20, the SDV server 18 is given the control IP address of the QAM 30 so that the SDV server 18 may directly control session bindings. Prior to granting QAM shell session space (and thereby bandwidth) to the SDV server 18, the SRM 20 sets up the actual shell sessions on the selected QAM in order to prepare it for binding requests from the SDV server 18. The QAM is not told what server may request these bindings since they may come from a primary or a backup SDV server 18. Since the SRM 20 is the master bandwidth controller in the system, the SRM 20 may need to recover bandwidth previously assigned to the SDV server 18. The SRM 20 may do so by sending a Bandwidth Reclamation Request to the SDV server 18 for a specified service group. Upon receipt of such a request, the SDV server 18 initiates a QAM session teardown request for sufficient shell session bandwidth to cover the reclamation.

The SDV server 18 is part session manager in that it directly receives and processes settop box channel change requests. It is also part resource manager in that, for its allocation of QAM shell sessions, it can bind and thus assign those to real programs for transmission to the service groups. The SDV server 18 receives channel change requests for switched content from a settop to bind that content to a session on a QAM feeding that settop's service group, and responds to that settop box with the frequency and program number where that content may be found. The SDV server 18 also fields channel change request messages for non-SDV broadcast channels in order to gather anonymous usage statistics and understand activity.

The SDV server 18 can anticipate spectrum demand for SDV and request shell sessions from the SRM 20 before running out of available QAM bandwidth. In the absence of new shell sessions from the SRM 20, the SDV server 18 reallocates existing bandwidth in order to provide for active users at the expense of inactive ones. Conversely, if the SDV server 18 recognizes that it is controlling bandwidth in excess of its anticipated requirements, then the SDV server 18 may initiate session teardown requests to the SRM 20 in order to return the excess bandwidth to the total system pool. This give and take process is ideally arbitrated by a central controller (global SRM) in the context of business rules.

The ebb and flow of edge resource allocation can be volunteered by the servers of various contending services or forced upon them by the SRM 20. The SDV server 18 generates a repeating (carousel) file containing a list of services currently streaming to each service group, and the tuning parameters required to access them. This "mini-carousel" serves as a redundant tuning mechanism, and in some cases (such as the presence of contention in the upstream communications path) serves to improve channel change response time. The mini-carousel technique applies to any SDV system where the control path is independent of the media path or where the latency or reliability of interactive signaling may degrade while the media remains usable. Each service group requires a unique mini-carousel, which may be replicated in each of the QAM RF carriers and/or may employ other delivery methods. This typically low-bandwidth (150 kbps) stream allows the settop box to tune already-streaming programs in the absence of two-way communication. This makes the SDV system very reliable in the face of impaired two-way connectivity, and is critical for launch of SDV in the presence of non-responding settop boxes.

The SDV server 18 requires connection to both the control network, for communication with other network elements including the clients, and also to the content routing network in order to make the mini-carousel IP multicast available to SDV client via the content-carrying QAM modulators. In order to prevent settop boxes from accessing incorrect content due to outdated information in the mini-carousel, the server must manage program numbers for SDV ensuring that no two programs share the same program number.

SDV servers 18 may be deployed in the headend or distributed at remote hubs. Since the multimedia content streams are independent of the SDV communications and control, centralizing the servers does not require separate content streams per service group. Unlike VOD, transport system cost does not appreciably increase based on SDV server location, as long as the switch-routers are distributed to the hubs.

The user interface for control of the SDV servers and system is in the SDV Manager 16. The SDV manager 16 provides a means for operator configuration of the service group assignments and various settings for the SDV servers. The interface between the manager and servers is Simple Network Management Protocol (SNMP). The SDV Client 14 is a software component that should be fully integrated in the resident application (navigation guide) of an SDV-enabled settop box 12 in order to make the SDV service transparent to the user. The SDV client 14 enables the settop box 12 to communicate to the SDV server 18 using the SDV Channel Change Message Interface Specification.

Figure 2:
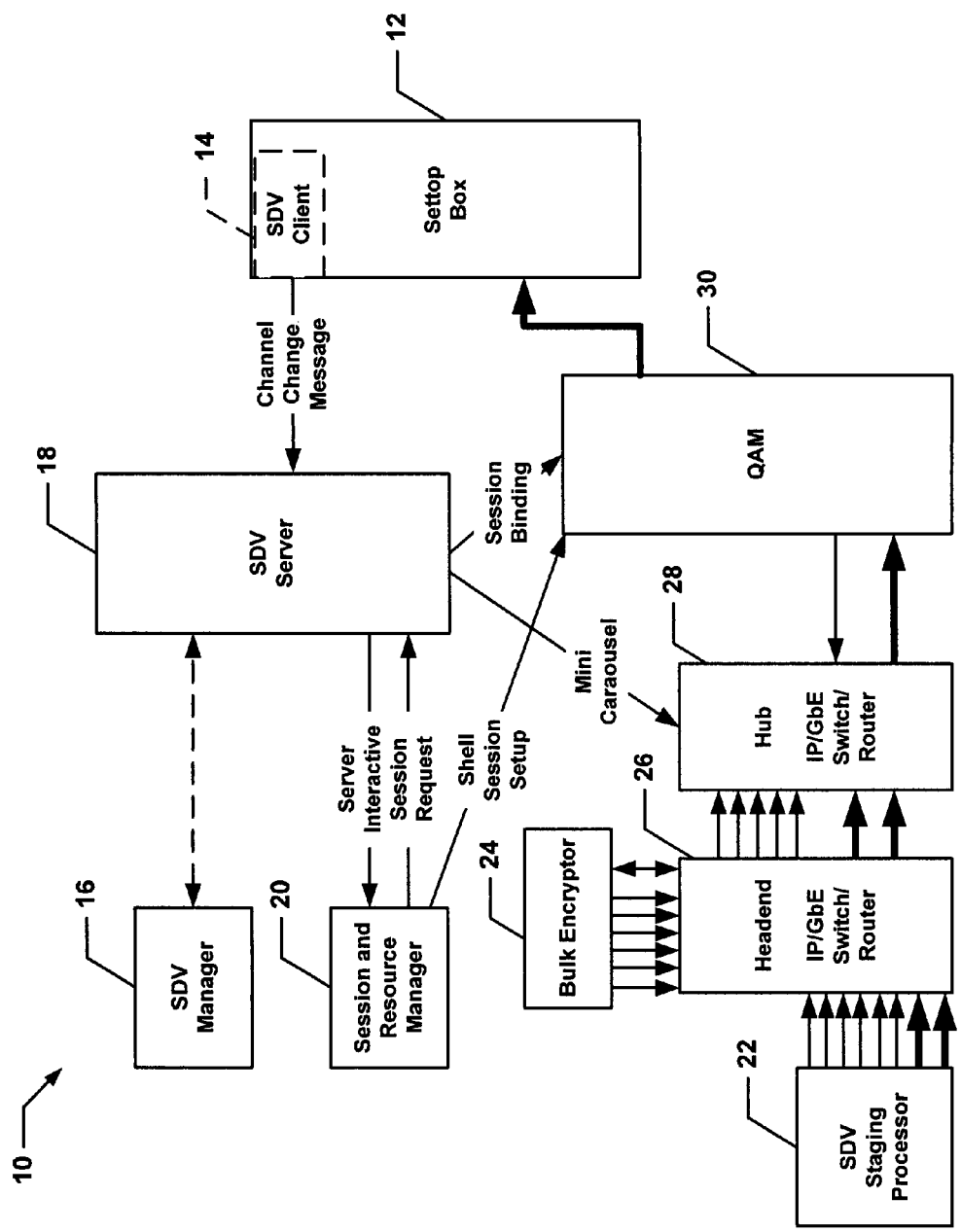
FIG. 2 depicts a block diagram of a particular embodiment of a switched digital video system showing message flow for the system.

Referring now to FIG. 2, the system interfaces for the SDV system 10 of the present invention are shown. The SDV Channel Change Message (CCM) Interface Specification 32 is used between the SDV server 18 and the SDV client 14 running on the settop box 12. This interface provides a mechanism for changing SDV channels, and also for notifying the system of channel changes to and between non-SDV channels. The SDV CCM 32 operates in conjunction with the mini-carousel. The SDV server 18 issues mini-carousel messages 34 at a periodic rate to convey a list of available services and the tuning information required to receive those services. Available services are those programs currently streaming in the digital service carriers offered to the client. When the user requests a channel change, and the requested service is listed as available in the mini-carousel, the client will select the service using the information obtained from the mini-carousel. When the confirm message is received, the client will re-select the service if the tuning information received in the confirm message differs from the current selection (frequency, modulation format, MPEG program number) state.

The mini-carousel operates between the SDV server 18 and the SDV client 14 running on a settop box 12. This interface provides a method of distribution of tuning information from the SDV server 18 to the SDV client 14 to enhance channel change operation. The mini-carousel carries information about the programs that are currently being carried in the SDV service. It also carries the IP addresses of primary and backup SDV servers used by the SDV client to communicate with the SDV server 18. The SDV server 18 originates the mini-carousel. It generates an IP multicast containing the mini-carousel and sends it to the closest content router (e.g., Hub 28).

Upon initializing, the SDV server 18 will acquire sessions on specific QAM frequencies in all SDV service groups. Through this initialization process and subsequent operation, the SDV server 18 learns the QAM frequencies that are available to SDV and binds a shell session on each of these frequencies to the mini-carousel IP multicast. The initial mini-carousel will include the topology information for the service group, i.e., the IP addresses of the primary and secondary SDV servers as well as the "listen port", the UDP port on the SDV server 18 to which the SDV client 14 delivers channel change requests. Subsequently, the SDV server 18 will add program tuning information for all programs.

Upon initialization, the SDV client 14 scans QAM frequencies in its service group to acquire the mini-carousel data. From the mini-carousel, the SDV client 14 extracts registration and communication information including the IP address of the SDV server 18, topology information (service group ID), client configuration parameters, and SDV channel map (tuning) information, and stores this information locally. The SDV client 14 extracts these parameters every time it acquires the mini-carousel data. If any of these parameters changes, the SDV client 14 performs re-registration with the SDV server 18.

The SDV client 14 also acquires and re-reads the mini-carousel each time a channel change request is made while the associated tuner is tuned to an SDV QAM frequency. If the version number of the mini-carousel has changed, the SDV client 14 will refresh its locally stored tuning information with the current information.

Upon initialization of the system 10, and after provisioning by the SDV manager 16, the SDV server 18 requests from the SRM 20 the initial bandwidth required for each of its service groups. The request and response 36 is done using the Session Setup Protocol Extension for Server Initiated Setup, an extension message set to DSM-CC. The bandwidths requested serve as an initial condition for each service group. More bandwidth may be requested from the SRM 18 as required by demand for unique SDV services. When less bandwidth is required for extended periods, the SDV server 18 may release some bandwidth back to the SRM's pool. The initial bandwidth requested and the minimum bandwidth maintained per server is user settable.

Bandwidth requests are for contiguous "groups" of the provisioned "fundamental bandwidth unit", in this case 625 kbps. An example may be a request for 36 "units" of 625 kbps for a total contiguous bandwidth allocation of 22.5 Mbps. This does not mean that the SDV server 18 is in any way constrained to use this bandwidth for services of 625 kbps or any other number. What it does is provide a total bandwidth in bits per second for the SDV server 18 to manage as required. For example, this bandwidth could be used for one High Definition (HD) service at 15 Mbps, plus two Standard Definition (SD) services at 3.75 Mbps. It could also be used for six SD services at 3.75 Mbps. It could also be used for one HD service at 22.2 Mbps and one audio service at 300 kbps. There is no requirement to use the bandwidth in multiples of the fundamental unit. No "quanta" of bandwidth is required or implied.

When requesting session bandwidth for service groups, the SDV server 18 also provides a session identifier or session ID for each session in the group. To maintain unique session IDs in the system, the requester uses its own Media Access Control (MAC) address as the leading bytes in the session identifier (ID).

Prior to granting bandwidth to the SDV server 18 for QAM 30, the SRM 20 sets up a shell session 38 for each session ID granted. The SRM 20 grants the bandwidth the SDV server 18 has requested for a particular service group. Note that the SDV server 18 has no knowledge of what QAM modulators feed the service group for which this request is being made. When the bandwidth is granted the QAM chassis and carrier on which it is granted is identified by control IP address and transport stream Identifier (TSID). Applications, such as SDV learn the control IP address and TSIDs of resources currently available to those applications only upon those resources being granted through Server Interactive Session Request messaging. The SRM 20 is not obligated to grant all bandwidth requested by the SDV server 18. The SRM 20 is the master controller of bandwidth and may be driven by business rules to allocate bandwidth to applications. Those applications may request at will, but will have to function gracefully with what has been granted. The goal of bandwidth initialization is to provide an SDV server 18 with an allocation of contiguous bandwidth for each service group, along with enough session IDs such that it can use that bandwidth in the granularity required.

An example of a basic channel change operation will now be described. Once groomed and encrypted streams are available, the SDV server has requested an initial allotment of bandwidth and session IDs from the SRM, and settop boxes have initialized, the system 10 is primed for channel change requests. When an SDV capable settop box 14 seeks to receive switched content, it sends a channel change request to its assigned SDV server's IP address (channel change request 32). In the channel change request 32, the settop box 14 specifies the desired service (for example "Channel 8"), and includes the service group number that was automatically discovered. Upon receiving a channel change request 32 from a settop box 12 within a specified service group, the SDV server 18 will look to see if the requested content is already available to the service group. If so, the SDV server 18 simply responds to the settop box 12 providing the required tuning information, including frequency, modulation type and program number. If the requested content is not already available to the service group, then the SDV server 18 will make it available. The SDV server 18 looks for available bandwidth on a QAM modulator belonging to that service group. The SDV server 18 considers the bandwidth of the requested service and attempts to intelligently allocate the bandwidth such as to maintain contiguous bandwidth for future requests of low and high bandwidth services.

Once a particular QAM carrier with available bandwidth has been selected for the requested service, the SDV server uses Session Binding messages 40 to specify the content for an existing session ID. For example, the SDV server 18 tells QAM 30 to "bind" the appropriate session ID to a service to be found at specified multicast addresses, which requires 15 Mbps of bandwidth. The bandwidth supplied at binding will likely not be the same as the bandwidth specified when the shell session was created. The bandwidth (in bits per second) supplied at binding is the actual bandwidth to use for purposes of de-jittering and bit rate accounting. QAM 30 is probably one carrier in a chassis supplying other carriers to other service groups. The QAM modulator chassis containing QAM 30 may already be receiving "SDV Channel 8" and transmitting it to a different service group on a different carrier. In this case, this stream must now be sent to the new requesting service group as well. Thus the QAM modulator 30 acts as the service "switch" in this case.

In the case where the QAM chassis is not already receiving SDV Channel 8 for another service group, then that QAM chassis must request to receive that content from the network. It does this by issuing an Internet Group Management Protocol (IGMP)v3 "Membership Report" 42 to the edge switch-router 28 requesting to "join" the IP multicast for that content. In this case, the "switching" of the switched service occurs in the network switch-router 28 and flows into the QAM 30 by way of path 4, and through the QAM 30 to the settop box 12 as shown by path 46.

Prior to receiving the first channel change request from a specific settop box, the SDV server 18 has no knowledge of that settop box. The SDV server 18, as an independent application, does not tap into any database of settop boxes nor their authorizations. As the SDV server 18 receives channel change requests from settop boxes, it learns about those settop boxes and enters them into its database. From that point on, the SDV server 18 expects to hear future channel change requests, or if none, periodic activity reports from those settop boxes. In order to keep its database free of records for inactive settop boxes, if after a specified time the SDV server 18 has not heard an activity report, it deletes the settop box from its database.

The SDV client 14 is responsible for not requesting a channel change to services for which it is not authorized. If the SDV client did send such a channel change request, the SDV server 18 would return tuning information and otherwise respond normally. The client, however, would not be able to decrypt and display any encrypted services for which it is not authorized.

The Basic Channel Change Sequence described above covered the case in which there was sufficient unused shell session bandwidth to cover channel-change requests to content that was not already on a service group. It also covered the case where the content was already available to the service group. There can be a situation wherein a channel-change request is received for content not already available to a service group, and there is insufficient available shell-session bandwidth. In this case the SDV server 18 may immediately issue a server interactive session request to the SRM 20 for more shell session bandwidth. This request may be identical to the requests made during initialization of the SDV server 18. However, instead of using increments of the "fundamental bandwidth unit", the SDV server 18 may elect to request a session or sessions for exactly the bandwidth required in order to expedite the grant. If available, the SRM 20 may grant additional shell session bandwidth, and the channel-change will then proceed as described above.

Due to business rules, other use of the available narrowcast bandwidth, or heavy use of all edge QAMs, the SRM 20 may reject the request for additional shell sessions. In this case, the SDV server 18 must review its rules and last user-activity on its existing managed bindings, and decide whether to terminate an existing binding and reuse if for the current request, or to cause the settop box 12 to display a message reporting the temporary unavailability of the requested service.

When a channel change is requested by a user, a channel change request is sent out at the time the user tries to change the channel. The settop box is able to check if the channel is already available to the user by way of the mini-carousel tuner table. As such, an immediate change request may not be required, however a channel change request is needed at some point in time as the SDV server needs to know how many users are interested in the channel and also for accounting purposes.

There may be a situation when a large number of channel change requests occur together (referred to as a "flash mob" of channel changes), for example at a top of an hour or when a commercial occurs. In such a situation, the SDV server may become inundated with channel change requests, causing a slowing down of SDV services between the SDV server and the corresponding settop boxes. The performance of the SDV server is not the only potential bottleneck, but also the narrow upstream channels between the settop box and the SDV server become overloaded. Further, the flash mob of channel change requests that are directly user generated are not a prime threat, but instead the flash mob of channel changes produced by Personal Video Recorders (PVRs) or the like can contribute to the delay in providing the channel change requests to the SDV server.

By way of embodiments of the present invention, a buffering of channel change requests under certain conditions is performed. In a particular embodiment of a method for providing channel change requests in a Switched Digital Video (SDV) system, the method includes receiving a request for a channel change at a settop box. The method further includes determining if a channel requested by the request for a channel change is currently being provided to the settop box. When the channel requested by the request for a channel change is being provided to the settop box then the request for a channel change is buffered for transmission of the request for a channel change at a later time. On the other hand, when the channel requested by the request for a channel change is not being provided to the settop box then the request for a channel change is sent immediately to an SDV server in communication with the settop box.

The buffering of one or more request for a channel change for transmission of the request for a channel change at a later time may further include grouping together multiple requests for a channel change and transmitting the multiple requests for channel change together (also known as "packing" channel change requests). This may further include sending the multiple requests for a channel change after a predetermined period of time has elapsed, which also serves to reduce jitter. Additionally, it is common for a user to 'channel surf' wherein the user cycles through channels in a sequential manner. In this mode the transmit delay can be made higher than usual as the user can be expected to continue changing channels.

In some situations, the requests for a channel change can be anticipated, and the requests sent from the settop box to the SDV server before a flash mob of channel change requests occurs. The anticipation of a channel change request can be based on a prior history associated with a particular settop box or due to an occurrence of an event which draws a large number of viewers such as the Super Bowl. Additionally, if an inbuilt PVR has a scheduled recording, the settop box and/or server knows that a channel change needs to occur in the future.

Figure 3:
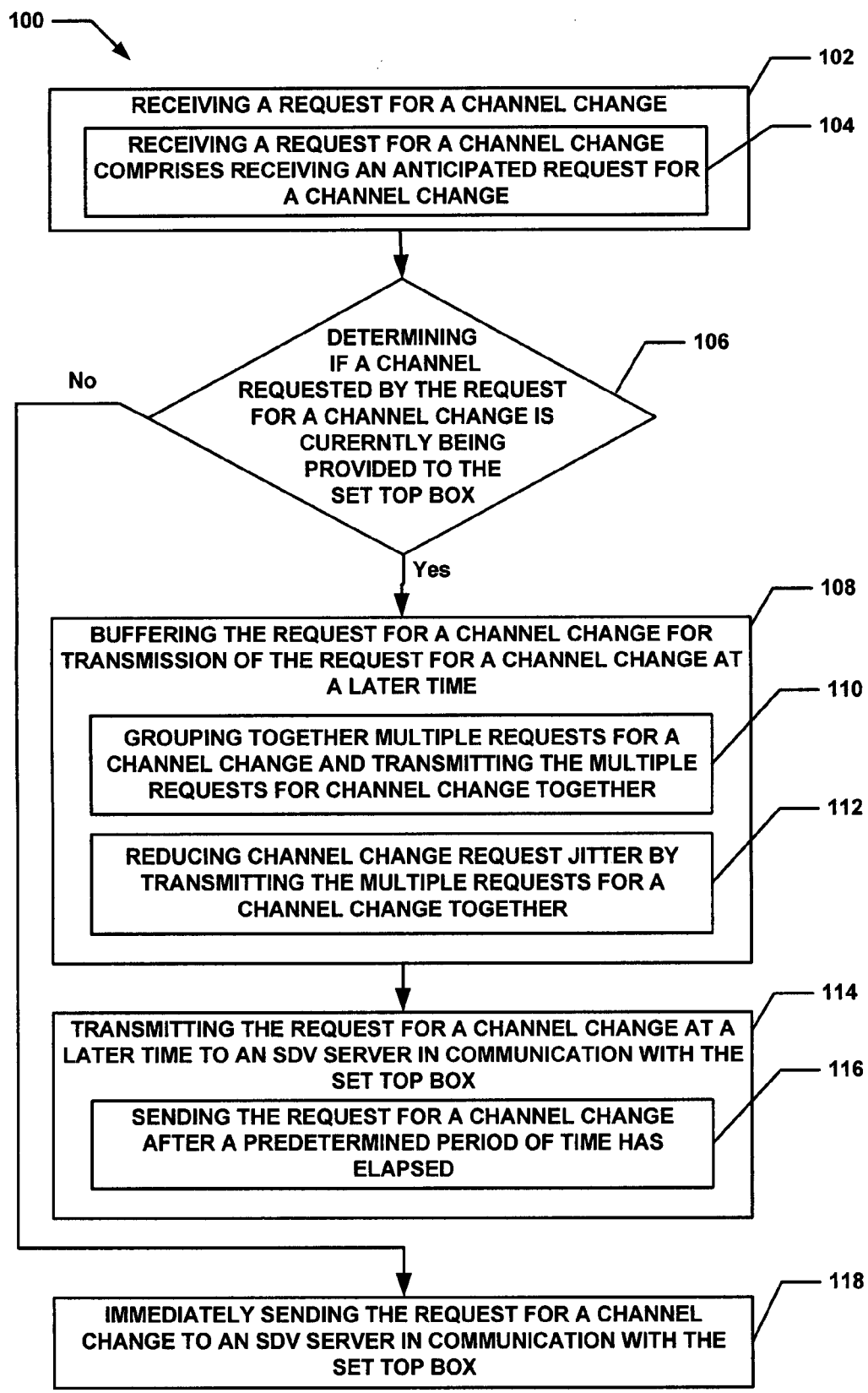
FIG. 3 depicts a flow diagram of a particular embodiment of a method of performing channel change requests in accordance with embodiments of the present invention.

A flow chart of a particular embodiment of the presently disclosed method is depicted in FIG. 3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of providing scalability for channel change requests in a Switched Digital Video (SDV) system is shown. The method 100 begins with processing block 102 which discloses receiving a request for a channel change. In certain embodiments this can include, as shown in processing block 104, receiving an anticipated request for a channel change.

Processing continues with decision block 106 wherein a determination is made regarding whether the channel requested by the channel change request is currently being provided to the settop box. Channels are provided as groups of channels to the settop box in SDV systems. The channel requested might be one of the channels of the block of channels already provided to the settop box.

When the determination in decision block 106 is that the channel being requested by the channel change request is being provided to said settop box, as shown in processing block 108 a buffering of the request for a channel change for transmission of the request for a channel change at a later time occurs. Processing block 110 states that in certain scenarios, it may be possible to group together (pack) multiple requests for a channel change and transmitting the multiple requests for channel change together. This serves to decrease load on the SVD server as the SDV server can process the requests in one group rather than in individual packets. As shown in processing block 112, this transmitting of multiple requests for a channel change together reduces channel change request jitter.

Processing continues with processing block 114 which recites transmitting the request for a channel change at a later time. As shown in processing block 116 the transmitting the request for a channel change at a later time comprises sending the request for a channel change after a predetermined period of time has elapsed.

Referring back to decision block 106, when the determination is that the channel being requested by the channel change request is not being provided to the settop box, then processing continues with processing block 118. Processing block 118 recites immediately sending the request for a channel change to an SDV server in communication with said settop box.

Embodiments of the present invention, by caching the current channel change requests and jittering and packing the requests, the scalability and response time of the SDV device can be increased during flash mobs of channel change requests and also in general usage. The present invention serves to separate the time-independent information from stale information and provided prioritized processing of the time-dependent information.

Figure 4:
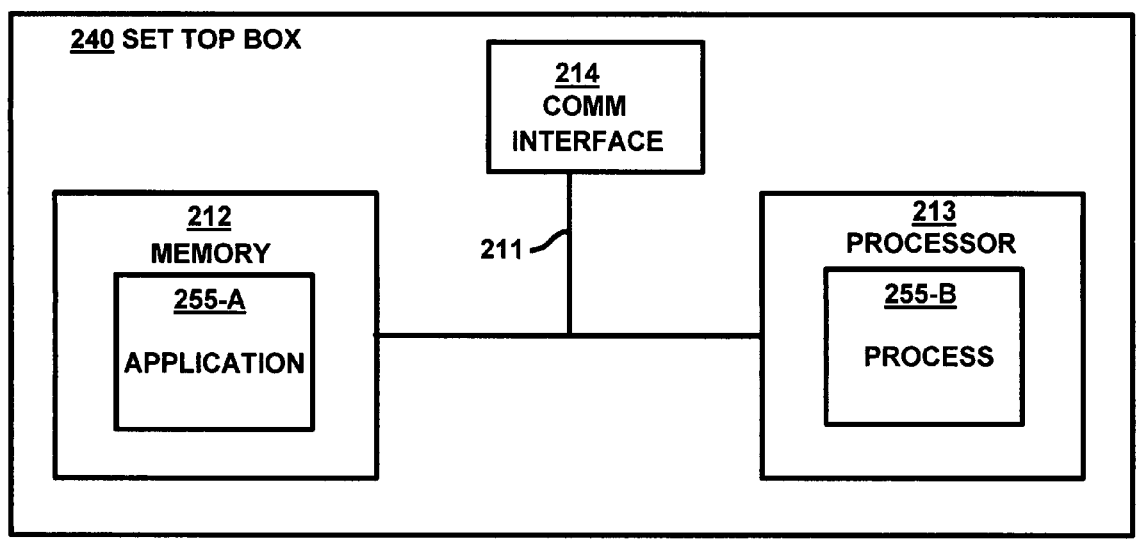
FIG. 4 illustrates an example settop box architecture that performs channel change requests in accordance with embodiments of the invention.

FIG. 4 illustrates example architectures of a computer system that is configured as a settop box 240. In this example, the settop box includes an interconnection mechanism 211 that couples a memory system 212, a processor 213, and a communications interface 214. The communications interface 214 allows the settop box 240 to communicate with external devices or systems. The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the settop box in order to produce a corresponding process 255-B. In other words, the process 255-B represents one or more portions of the application 255-A performing within or upon the processor 213 in the settop box.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A method of providing channel change requests in a Switched Digital Video (SDV) system, the method comprising:
   receiving a request for a channel change;
   determining if a channel requested by said request for a channel change is being provided to said settop box;
   when said channel requested by said request for a channel change is currently being provided to said settop box then:
      buffering said request for a channel change for transmission of said request for a channel change at a later time,
      determining whether a plurality of sequential channel change requests have been received, and
      when the plurality of sequential channel change requests have been received, increasing the later time for transmission of said request for the channel change; and
   when said channel requested by said request for a channel change is not being provided to said settop box then immediately sending said request for a channel change to an SDV server in communication with said settop box.

2. The method of claim 1 further comprising transmitting said request for a channel change at a later time.

3. The method of claim 2 wherein said transmitting said request for a channel change at a later time comprises sending said request for a channel change after a predetermined period of time has elapsed.

4. The method of claim 1 wherein said buffering said request for a channel change for transmission of said request for a channel change at a later time further comprises grouping together multiple requests for a channel change and transmitting said multiple requests for channel change together.

5. The method of claim 4 further comprising reducing channel change request jitter by transmitting said multiple requests for a channel change together.

6. The method of claim 1 wherein said receiving a request for a channel change comprises receiving an anticipated request for a channel change.

7. A settop box comprising:
   a memory;
   a processor;
   a communications interface;
   an interconnection mechanism coupling the memory, the processor and the communications interface; and
   wherein the memory is encoded with an application providing channel change requests in a Switched Digital Video (SDV) system, that when performed on the processor, provides a process for processing information, the process causing the settop box to perform the operations of:
      receiving a request for a channel change;
      determining if a channel requested by said request for a channel change is currently being provided to said settop box;
      when said channel requested by said request for a channel change is being provided to said settop box then:
         buffering said request for a channel change for transmission of said request for a channel change at a later time,
         determining whether a plurality of sequential channel change requests have been received, and
         when the plurality of sequential channel change requests have been received, increasing the later time for transmission of said request for the channel change; and
      when said channel requested by said request for a channel change is not being provided to said settop box then immediately sending said request for a channel change to an SDV server in communication with said settop box.

8. The settop box of claim 7 further comprising said settop box performing the operation of transmitting said request for a channel change at a later time.

9. The settop box of claim 8 wherein said buffering said request for a channel change for transmission of said request for a channel change at a later time further comprises grouping together multiple requests for a channel change and transmitting said multiple requests for a channel change together.

10. The settop box of claim 9 further comprising the operation of reducing request jitter by transmitting said multiple requests for a channel change together.

11. The settop box of claim 7 wherein said transmitting said request for a channel change at a later time comprises sending said request for a channel change after a predetermined period of time has elapsed.

12. The settop box of claim 7 wherein said receiving a request for a channel change comprises receiving an anticipated request for a channel change.

13. A computer readable medium having computer readable code thereon for providing channel change requests in a Switched Digital Video (SDV) system, the medium comprising:
   instructions for receiving a request for a channel change;
   instructions for determining if a channel requested by said request for a channel change is currently being provided to said settop box;
   instructions for when said channel requested by said request for a channel change is being provided to said settop box then:
      buffering said request for a channel change for transmission of said request for a channel change at a later time,
      determining whether a plurality of sequential channel change requests have been received, and
      when the plurality of sequential channel change requests have been received, increasing the later time for transmission of said request for the channel change; and
   instructions for when said channel requested by said request for a channel change is not being provided to said settop box then immediately sending said request for a channel change to an SDV server in communication with said settop box.

14. The computer readable medium of claim 13 further comprising instructions for transmitting said request for a channel change at a later time.

15. The computer readable medium of claim 14 wherein said instructions for transmitting said request for a channel change at a later time comprises instructions for sending said request for a channel change after a predetermined period of time has elapsed.

16. The computer readable medium of claim 13 wherein said instructions for buffering said request for a channel change for transmission of said request for a channel change at a later time further comprises instructions for grouping together multiple requests for a channel change and instructions for transmitting said multiple requests for a channel change together.

17. The computer readable medium of claim 16 further comprising instructions for reducing request jitter by transmitting said multiple requests together.

18. The computer readable medium of claim 13 wherein said instructions for receiving a request for a channel change comprises instructions for receiving an anticipated request for a channel change.

19. A Switched Digital Video (SDV) system comprising:
   an SDV server;
   at least one settop box, each of said at least one settop box in communication with said SDV server; and
   wherein at least one of said settop box is capable of
      receiving a request for a channel change from a user,
      determining if a channel requested by said request for a channel change is currently being provided to said settop box,
      when said channel requested by said request for a channel change is being provided to said settop box then buffering said request for a channel change for transmission of said request for a channel change at a later time to said SDV server, determining whether a plurality of sequential channel change requests have been received, and when the plurality of sequential channel change requests have been received, increasing the later time for transmission of said request for the channel change, and
      transmitting said request for a channel change at a later time, and when said channel requested by said request for a channel change is not being provided to said settop box then immediately sending said request for a channel change to said SDV server.

20. The system of claim 19 wherein at least one of said settop box groups together multiple requests for a channel change and transmits said multiple requests for a channel change together to said SDV server.

* * * * *